June 1, 1965   M. VACANTE   3,186,729
STEERING WHEEL MECHANISM
Filed Aug. 29, 1962   2 Sheets-Sheet 1

INVENTOR.
MATTHEW VACANTE
BY Eugene S. Lovette
ATTORNEY

June 1, 1965 — M. VACANTE — 3,186,729
STEERING WHEEL MECHANISM
Filed Aug. 29, 1962 — 2 Sheets-Sheet 2

INVENTOR.
MATTHEW VACANTE
BY Eugene S. Lovette
ATTORNEY

3,186,729
STEERING WHEEL MECHANISM
Matthew Vacante, Syosset, N.Y., assignor to Postless Steering by Dual Wheels Co., Inc., Baldwin, N.Y.
Filed Aug. 29, 1962, Ser. No. 220,256
3 Claims. (Cl. 280—87)

The present invention relates to automotive steering wheels, and more particularly to a novel steering mechanism which is adapted to afford easier maneuverability of the vehicle while considerably reducing the lethal hazards of accidents.

It is well established in the field of automotive vehicles that the orthodox steering post, used for a number of decades without substantial changes, may be a deadly hazard when a vehicle is involved in an accident. The sudden loss of speed of a vehicle, due either to intensive braking or to a collision, tends to hurl the driver forward, exactly in the direction of the steering post. Insurance statistics have proven beyond doubt that the hazard presented by the steering column or post protruding toward the chest and stomach of the driver should be eliminated.

Attempts have been made in the automotive field to solve this problem by the provision of sunken steering wheels. Also, some car manufacturers have made the wheel proper resilient, or have attached it to the steering column in a fashion as to yield in case the car is involved in an accident. These solutions are only partial and while offering only superficial solutions, tend to render driving uncertain or tiresome.

Another disadvantage of the known steering wheel consists in the circumstance that the driver's view is partly obstructed both in the direction of the road and toward the instrument panel, part of which is usually hidden by the wheel proper. Some of the controls and/or instruments had so far to be arranged sideways, a certain distance from the driver's seat, because the closest sections of the front panel are the most obstructed ones.

It is thus the object of the present invention to provide a new, safe and advantageous dual steering wheel which substantially eliminates the aforementioned drawbacks of known arrangements.

It is one of the major objects to avoid the use of a steering post and of any element which may endanger the driver's safety. In addition, the invention envisages to offer a better overall view toward the road and the instrument panel, making for an easier and less tiresome operation of the vehicle.

It is another object of the present invention to make for easier servicing and access of the instrument panel and the electrical wiring usually concealed therebehind. Furthermore, the invention allows to locate certain controls and/or indicators, e.g. the shifting gear push-buttons and/or the speedometer dial, in a location right in front of the driver.

According to one of the major features of the invention, the steering post or column is eliminated and replaced by drive means which lead preferably to the cowl panel of the vehicle. Instead of a steering wheel facing the driver in a plane more or less parallel to his chest, the present invention provides a dual wheel structure comprising two vertical wheel members having planes substantially perpendicular to the driver's body.

It is another major feature of the invention that the two, preferably parallel, wheel members are interconnected to rotate in opposite directions. Thus, for example, the wheel member closer to the right hand of the driver may be rotated with its top edge forward, that is, in a clockwise direction, if viewed from the right; at the same time, the wheel member facing the driver's left hand will rotate in a counterclockwise direction, that is with its bottom edge in a forward direction. The aforementioned movement of the dual wheel, executed either with the right hand or the left hand of the driver in said respective directions, can be used for making a right turn with the vehicle; conversely, the vehicle may make a left turn when the left-hand wheel member is rotated top forward (clockwise) while the right-hand member rotates oppositely. It will be understood that the reverse arrangement may also be adopted, if this should prove more convenient.

A still further feature of the invention consists in the provision of a gearing mechanism for interconnecting the two wheel members for simultaneous but opposite rotation. According to the preferred embodiment, this gearing mechanism may be provided within the hub of one of the wheel members, the other member being driven by the central driving shaft protruding through said mechanism. Another embodiment within the scope of the present invention provides the gearing mechanism outside of either wheel member, one of them being driven by the driving shaft proper while the other, preferably the one closer to the gearing mechanism, may be linked to the latter by the intermediary of a sleeve surrounding said shaft.

Further objects and advantages will become apparent from the following description of the invention taken in conjunction with the figures, in which:

FIG. 2a is a sectional view taken along line 2a—2a of FIG. 1a.

Figure 1:
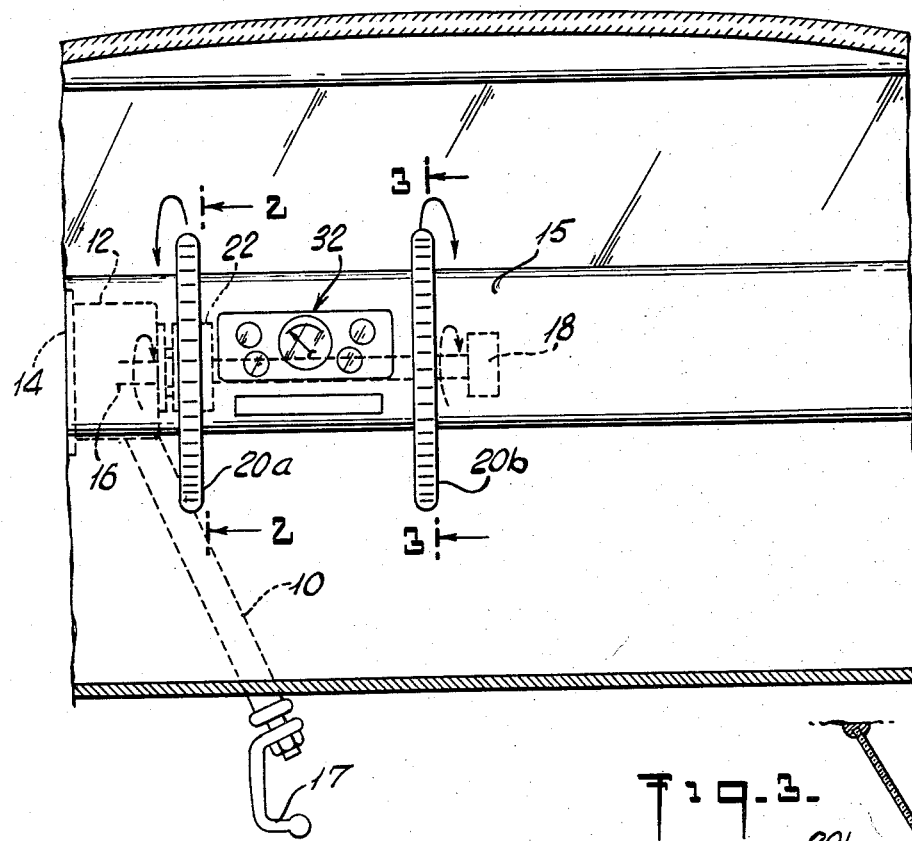
FIG. 1 represents a somewhat schematic elevation of the dual steering wheel as viewed from the driver's seat.

In the preferred embodiment illustrated in FIGS. 1 through 4, a steering shaft 10 is schematically shown, which leads to a steering box 12 supported by the cowl panel 14 or other available structures of the vehicle. Through conventional gearing (not shown) within box 12, a substantially horizontal shaft 16 is linked to steering shaft 10 for the purpose of turning pitman arm 17. The end of shaft 16 remote from box 12 is journalled by bearing means 18, which means may be supported from the instrument panel 15. Shaft 16 carries two wheel members, namely a left-hand member 20a and a right-hand member 20b, the operative connections of which shall be explained in more detail hereunder.

In said FIGS. 1 through 4, a gearing mechanism designated as 22 is substantially coaxially aligned within wheel member 20a. Within this mechanism 22, shaft 16 carries a pinion 24 to turn therewith. Pinion 24 is in meshing engagement with two intermediate gears 26 supported by a stationary bracket member 28. In other words, gears 26 rotate about their respective axes 27, but bracket 28 may be braced as a stationary reference by available panel or cowl structure or in a manner similar to that shown in FIG. 1a. For the sake of clarity, only two gears 26 have been shown in FIG. 2 although, as will be appreciated by those skilled in the art, more gears may be interposed between pinion 24 and an inner toothing 30 rigidly connected to wheel member 20a. The gearing in mechanism 22 is preferably designed so that wheel 20b (attached to shaft 16) turns through the same angular distance as wheel 20a; however, the individual wheels 20a, 20b by the illustrated arrangement turn in opposite directions but unequal amounts due to the gear reduction shown.

Figure 2:
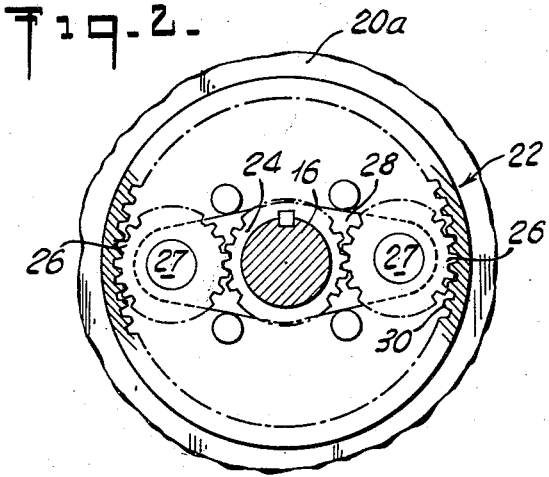
FIG. 2 is a sectional view taken along line 2—2 of FIG. 1.

It will be clear from the above description that wheel member 20a rotates in a direction opposite to that of shaft 16, as indicated by the arrows on FIGS. 1 and 2. Wheel member 20b is rigidly secured to shaft 16 and rotates in unison therewith. Hence, wheel 20b rotation is in a sense opposite to that of member 20a. The gearing transmission to and from steering shaft 10, as well as between the latter and shaft 16, may be provided so that counterclockwise rotation of wheel member 20a (if viewed in FIG. 2, that is, from the right-hand side of FIG. 1) will result in a left-hand turn of the vehicle road wheels, which can also be accomplished by clockwise rotation of wheel member 20b.

If driving preferences or other operational considerations should warrant it (e.g. for tractors or other vehicles where considerable rearward driving is done), the gearing may be provided in a reversed sense so that clockwise movement of member 20a produces a right-hand turn of the vehicle, and vice versa.

Figure 3:
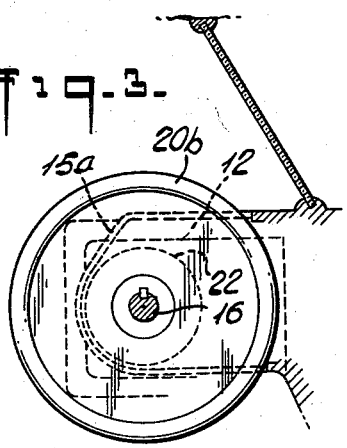
FIG. 3 is a similar view but taken along line 3—3 of FIG. 1.
Figure 4:
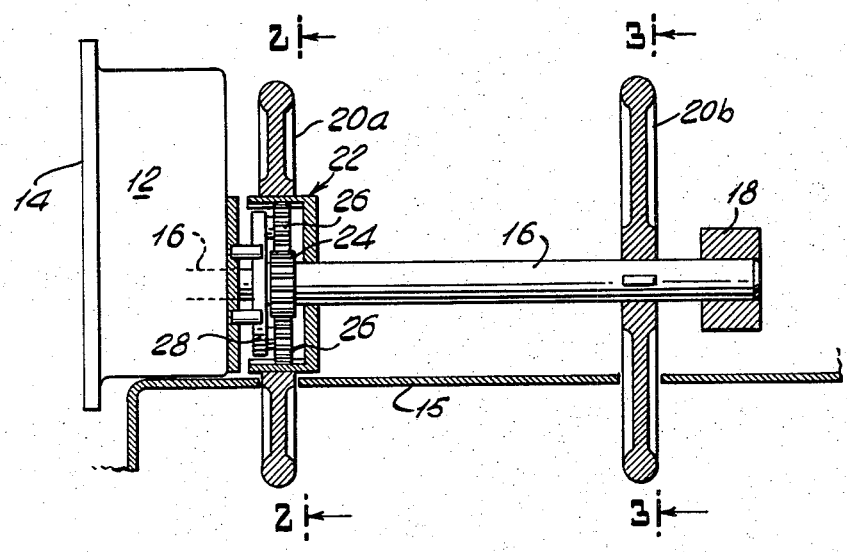
FIG. 4 is a section through the steering mechanism of FIG. 1.

Panel 15 may be given a portion 15a (shown in FIG. 3) protruding slightly in the direction of the driver's seat. This portion may serve to encase some of the instruments and/or control elements as schematically shown at 32, FIG. 1. These can be, for example, the gear-shift pushbuttons usually lodged a certain distance to the left or right of the driver's position. Hence, shaft 16 extends axially behind the front wall of instrument panel 15 and wheels 20a, 20b are recessed partly behind the instrument panel 15 as best shown in FIG. 3.

Figure 1A:
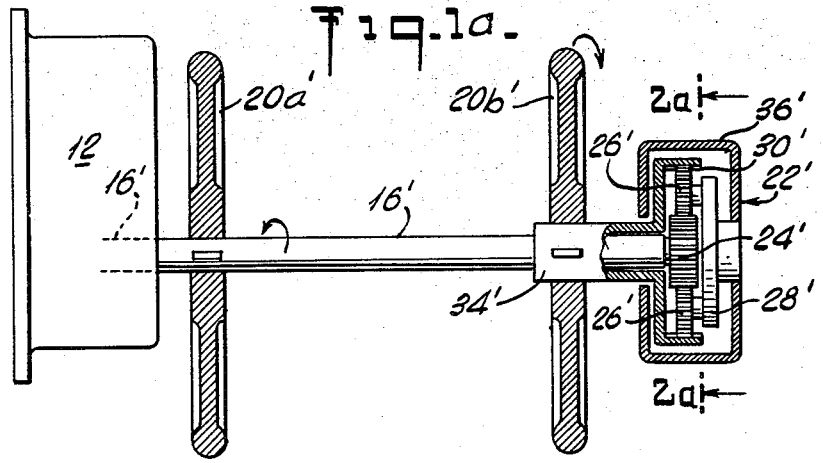
FIG. 1a represents a modified embodiment, similar to FIG. 1.
Figure 2A:
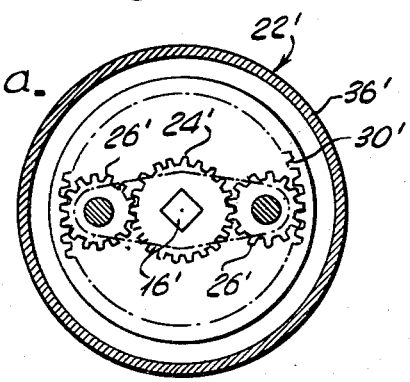

FIGS. 1a and 2a schematically illustrate an alternate embodiment of the invention, in which a gearing mechanism 22' is provided at the end of shaft 16' remote from the steering box 12. For the sake of simplicity, the steering shaft and the panel have been omitted in these figures. Wheel members 20a' and 20b' are mounted and interconnected in a manner somewhat different than the previous embodiment. In FIGS. 1a and 2a, it is the wheel member 20a' which is rigidly secured to shaft 16' to turn therewith, while member 20b' is carried by a sleeve 34' forming an extension of an inner toothing 30'. Wheel 20b' and sleeve 34' turn together. Sleeve 34' is roller or ball bearing supported with respect to shaft 16' passing therethrough so that these members can turn in opposite directions. Sleeve 34' is in meshing engagement with two or more rotatable intermediate gears 26' supported by a stationary member 28'. The pinion 24' is carried by shaft 16' to turn therewith. Pinion 24' is in driving engagement with the gears 26'. An outer housing 36' may be provided for the gearing mechanism 22' of this embodiment. Housing 36' is supported by the instrument panel (not shown). Bracket 28' is braced or attached by conventional means to housing 36'.

In the modified embodiment, wheel member 20b' rotates in a direction opposite to that of shaft 16', again as shown by the small arrows in FIG. 1a. Wheel member 20a' being attached to shaft 16', rotates in unison therewith, i.e., in a direction opposite to member 20b'.

It is intended that all matter contained in the above description or shown in the accompanying drawings shall be interpreted as illustrative and not in a limiting sense.

What is claimed is:

1. In an automotive vehicle having a passenger compartment for transporting at least one passenger, the combination comprising, first means for controlling directional travel of said vehicle, a turnable shaft supported in an axially lateral sense with respect to the normal position of the driver-passenger when steering said vehicle, steering box means for linking said shaft and said first means for transmitting to said first means the turning motion applied by the driver-passenger to said shaft, first and second steering wheels mounted over and operatively connected to said shaft for selectively turning said shaft in either direction about its axis, said wheels having rim portions in the vehicle passenger compartment within reach of the driver-passenger for permitting normal steering of said vehicle, one wheel being linked to said shaft to turn in the same direction therewith, and gear means intermediate said second wheel and said shaft for providing a reversal sense of simultaneous rotation of said second wheel with respect to said first wheel, whereby said first and second wheels are selectively rotatable in opposite directions about said shaft axis for producing the directional movement of said vehicle, and whereby the passenger compartment of said vehicle is free of stake-like impaling steering mechanism structure adjacent the driver-passenger.

2. The combination as claimed in claim 1, wherein a rim portion of each wheel being located with respect to the position normally occupied by the driver-passenger, whereby each wheel is within easy reach of a respective hand of such driver-passenger.

3. In an automotive vehicle having a passenger compartment for transporting at least one passenger, the combination comprising, first means for controlling directional travel of said vehicle, a turnable shaft supported in an axially lateral sense with respect to the normal position of the driver-passenger when steering said vehicle, second means for linking said shaft and said first means for transmitting to said first means the turning motion applied by the driver-passenger to said shaft, first and second steering wheels operatively connected to said shaft for selectively turning said shaft in either direction about its axis, said wheels having rim portions in the vehicle passenger compartment within reach of the driver-passenger for permitting normal steering of said vehicle, third means for linking one of said wheels to said shaft to turn both in the same direction, and fourth means intermediate the other of said wheels and said shaft for providing a reversal sense of simultaneous rotation of said other wheel with respect to said one wheel, whereby said first and second wheels are selectively rotatable in opposite directions about said shaft axis for producing the directional movement of said vehicle and whereby the passenger compartment of said vehicle is free of stake-like impaling steering mechanism structure adjacent the driver-passenger.

References Cited by the Examiner

UNITED STATES PATENTS

| 1,199,626 | 9/16 | Smithey. | |
| 1,297,095 | 3/19 | Carr | 74—498 |
| 1,364,243 | 1/21 | Caldwell | 74—498 |
| 1,391,032 | 9/21 | White | 180—90 X |
| 1,672,334 | 6/28 | Monsen | 74—498 X |
| 1,766,273 | 6/30 | Wine | 74—507 |
| 1,795,566 | 3/31 | MacComb. | |
| 2,129,851 | 9/38 | Lee | 180—90 X |
| 2,197,290 | 4/40 | Baker et al. | |
| 2,442,288 | 5/48 | Floria | 74—498 X |
| 2,674,903 | 4/54 | Doster | 74—498 XR |
| 2,746,698 | 5/56 | Ross. | |
| 3,093,389 | 6/63 | Hogsten | 280—87 |

FOREIGN PATENTS 322,138   11/54   Switzerland.

BROUGHTON G. DURHAM, *Primary Examiner.*